Patented Jan. 30, 1945

2,368,195

UNITED STATES PATENT OFFICE 2,368,195

INSECTICIDAL COMPOSITIONS

Edgar C. Britton, Gerald H. Coleman, and Wesley D. Schroeder, Midland, Mich., assignors to The Dow Chemical Company, Midland, Mich., a corporation of Michigan No Drawing. Application September 15, 1941, Serial No. 410,875

10 Claims. (Cl. 167—24)

The present invention is directed to new insecticidal materials and is particularly concerned with compositions comprising an insecticidal plant extract and as an added toxicant an N-hydrocarbon-substituted crotonamide.

Many organic toxicants have been suggested for inclusion in agricultural and household insecticidal compositions. Many of these compounds have been employed in combination with pyrethrin, rotenone, or other standard type insecticidal compositions in order to increase the eventual kill of parasites contacts with such products. The compositions heretofore obtained frequently have been charaterized by offensive odors, irritating properties, and unsatisfactory toxicity.

According to the present invention, insecticidal compositions comprising insecticidal plant extracts are modified with crotonamides having the following formula:

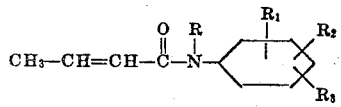

wherein R represents an alkyl radical containing from 1 to 4 carbon atoms, inclusive, and $R_1$, $R_2$, and $R_3$ each represents hydrogen or a hydrocarbon radical. These crotonamides are relatively insoluble in water, and somewhat soluble in many organic solvents. In the amounts employed, members of this group of compounds do not impart irritating properties or objectionable odor to the ultimate composition. The mixture of toxicants give high knockdowns and kills of both household and agricultural insects. In these compositions the crotonamide and plant extract toxicant exert a mutual activation whereby kills of insects are obtained which are greatly in excess of those predictable from a knowledge of the toxicities of the components of such compositions.

The new crotonamide toxicants may be employed in any suitable amount with pyrethrin- and rotenone-containing parasiticidal compositions.

From about 5 to about 50 grams of the crotonamide per liter is preferably employed in spray compositions comprising the plant extracts. A preferred solvent for such toxicant mixture is petroleum distillate although any suitable non-corrosive organic solvent and/or solubilizer for the plant extract and crotonamide may be employed. Similarly, the crotonamides of the present invention may be incorporated in aqueous dispersions and emulsions or in dusts comprising rotenone or pyrethrins. Suitable carriers in dust compositions include wood flour, diatomaceous earth, volcanic ash, sulfur, and the like.

The following example is illustrative of certain modes in which the invention may be applied but is not to be construed as limiting the same. In this example the procedure followed was substantially that described in Soap 8, No. 4, 1932 and known as the Peet Grady method. The pyrethrin-containing solution employed both as a control and as a solvent for the crotonamides consisted of a standard light petroleum distillate having dissolved therein the toxic principles from one-half pound of pyrethrin flowers per gallon of composition. This solution is hereinafter referred to as "pyrethrin control solution."

Example 2.5 gram portions of a number of representative N-alkyl-N-aryl-crotonamides were each dissolved in 100 milliliter portions of the pyrethrin control solution described above. Compositions were also prepared by dissolving 2.5 grams of each of the several crotonamides in 100 milliliter portions of the petroleum distillate employed in the preparation of the pyrethrin control solution. Both series of crotonamide solutions and the pyrethrin control solution alone were tested against five day old houseflies according to the Peet Grady method to determine their efficiency as regards knockdown and kill.

The following table sets forth the results obtained:

| Name of compound | Properties | In petroleum distillate | | In pyrethrin control solution | |
|---|---|---|---|---|---|
| | | Knockdown in 10 mins. | Kill in 24 hours | Knockdown in 10 mins. | Kill in 24 hours |
| N-methyl-N-phenyl-crotonamide | Boiling at 276°-278° C. at atmospheric pressure and having a sp. gr. of 1.048 at 25°/25° C. | 93 | 16 | 100 | 67 |
| N-ethyl-N-phenyl-crotonamide | Boiling at 142°-144° C. at 12 mm. pressure and melting at 45°-47° C. | 97 | 33 | 100 | 70 |
| N-normalbutyl-N-phenyl-crotonamide | Boiling at 142°-144° C. at 1 mm. pressure and having a sp. gr. of 0.99 at 25°/25° C. | 97 | 31 | 100 | 86 |
| Pyrethrin control solution | | | | 100 | 30 |

From the foregoing it is evident that the compositions comprising the pyrethrin-crotonamide mixtures give a kill against houseflies greatly in excess of what might have been predicted from a knowledge of the individual toxicities of the individual toxicants.

In a similar manner the N-alkyl-N-aryl-crotonamides or mixtures of two or more of such compounds may be combined with derris or other rotenone-containing plant extracts. Likewise mixtures of pyrethrin and rotenone extracts may be used in combination with the crotonamides. Other crotonamides which may be employed in the preparation of insecticidal mixtures include N-isopropyl-N-phenyl-crotonamide, N-normalbutyl-N-(2-ethylphenyl)-crotonamide, N-methyl-N-(2.4.6-trimethyl-phenyl)-crotonamide, N-ethyl-N-(4-cyclohexyl-phenyl)-crotonamide, N-normalpropyl-N-(4-tertiarybutyl-phenyl)-crotonamide, N-tertiarybutyl-N-(2-phenyl-phenyl)-crotonamide, N-ethyl-N-(4-tertiaryhexyl-6-phenyl-phenyl)-crotonamide, etc.

The phrase "non-corrosive organic solvent" refers to any organic solvent material unreactive with and capable of dissolving the toxicants hereinbefore described and noninjurious to the skin and general health of humans as employed, e. g. alcohol, methyl-ethyl-ketone, ethylene chloride, solvent naphtha, petroleum distillate, etc.

We claim:

1. An insecticidal composition comprising an active toxicant mixture consisting of a crotonamide having the following formula:

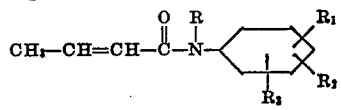

wherein R represents an alkyl radical containing from 1 to 4 carbon atoms, inclusive, $R_1$, $R_2$, and $R_3$ each represents a member of the group consisting of hydrogen and hydrocarbon radicals, and a product selected from the class consisting of the extracts of pyrethrin- and rotenone-bearing plants.

2. An insecticidal composition comprising an active toxicant mixture consisting of pyrethrin and a crotonamide having the following formula:

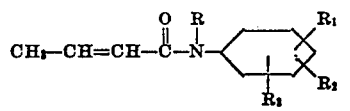

wherein R represents an alkyl radical containing from 1 to 4 carbon atoms, $R_1$, $R_2$, and $R_3$ each represents a member of the group consisting of hydrogen and hydrocarbon radicals.

3. An insecticidal composition comprising an active toxicant mixture consisting of a crotonamide having the following formula:

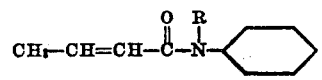

wherein R represents an alkyl radical containing from 1 to 4 carbon atoms, inclusive, and a product selected from the class consisting of the extracts of pyrethrin- and rotenone-bearing plants.

4. An insecticidal composition comprising an active toxicant mixture consisting of pyrethrin and a crotonamide having the following formula:

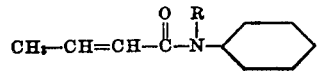

wherein R represents an alkyl radical containing from 1 to 4 carbon atoms, inclusive.

5. An insecticidal composition comprising a solution in a non-corrosive organic solvent of a product selected from the class consisting of the extracts of pyrethrin- and rotenone-bearing plants, and as an added toxicant a crotonamide having the formula:

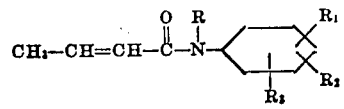

wherein R represents an alkyl radical containing from 1 to 4 carbon atoms, inclusive and $R_1$, $R_2$, and $R_3$ each represents a member of the group consisting of hydrogen and hydrocarbon radicals.

6. An insecticidal composition comprising a petroleum distillate solution of pyrethrin and as an added toxicant a crotonamide having the formula:

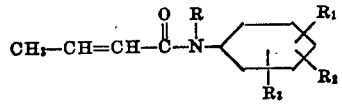

wherein R represents an alkyl radical containing from 1 to 4 carbon atoms, inclusive, and $R_1$, $R_2$, and $R_3$ each represents a member of the group consisting of hydrogen and hydrocarbon radicals.

7. An insecticidal composition comprising a petroleum distillate solution of pyrethrin and as an added toxicant a crotonamide having the formula:

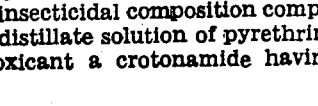

wherein R represents an alkyl radical containing from 1 to 4 carbon atoms, inclusive.

8. An insecticidal composition comprising a petroleum distillate solution of pyrethrin and N-methyl-N-phenyl-crotonamide.

9. An insecticidal composition comprising a petroleum distillate solution of pyrethrin and N-ethyl-N-phenyl-crotonamide.

10. An insecticidal composition comprising a petroleum distillate solution of pyrethrin and N-normalbutyl-N-phenyl-crotonamide.

EDGAR C. BRITTON.
GERALD H. COLEMAN.
WESLEY D. SCHROEDER.